United States Patent
Sato et al.

(10) Patent No.: US 11,256,928 B2
(45) Date of Patent: Feb. 22, 2022

(54) INFORMATION PROVIDING APPARATUS AND METHODS FOR A VEHICLE

(71) Applicant: SUBARU CORPORATION, Tokyo (JP)

(72) Inventors: Noeru Sato, Tokyo (JP); Takeshi Torii, Tokyo (JP); Ryuichi Sumikawa, Tokyo (JP); Akiko Sugiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 66 days.

(21) Appl. No.: 16/734,951

(22) Filed: Jan. 6, 2020

(65) Prior Publication Data

US 2020/0285865 A1 Sep. 10, 2020

(30) Foreign Application Priority Data

Mar. 7, 2019 (JP) .................. 2019-041863

(51) Int. Cl.
*B60K 35/00* (2006.01)
*G06K 9/00* (2022.01)

(52) U.S. Cl.
CPC .......... *G06K 9/00798* (2013.01); *B60K 35/00* (2013.01); *G06K 9/00845* (2013.01); *B60K 2370/166* (2019.05); *B60K 2370/186* (2019.05); *B60K 2370/52* (2019.05); *B60K 2370/736* (2019.05)

(58) Field of Classification Search
None
See application file for complete search history.

(56) References Cited

U.S. PATENT DOCUMENTS

| 5,717,591 | A | * | 2/1998 | Okada | B60T 8/1755 180/197 |
|---|---|---|---|---|---|
| 2005/0234626 | A1 | * | 10/2005 | Shiiba | B60W 10/18 701/70 |
| 2010/0211270 | A1 | * | 8/2010 | Chin | B62D 6/007 701/44 |
| 2011/0102166 | A1 | * | 5/2011 | Filev | B60W 30/18145 340/435 |
| 2015/0336587 | A1 | * | 11/2015 | Inoue | B62D 15/0285 701/41 |
| 2018/0009466 | A1 | * | 1/2018 | Akatsuka | B60W 10/20 |
| 2020/0122717 | A1 | * | 4/2020 | Kim | G06K 9/00791 |
| 2020/0130578 | A1 | * | 4/2020 | Murakami | G06K 9/0061 |

FOREIGN PATENT DOCUMENTS

JP 2003-99897 A 4/2003

* cited by examiner

*Primary Examiner* — Idowu O Osifade
(74) *Attorney, Agent, or Firm* — Troutman Pepper Hamilton Sanders LLP

(57) ABSTRACT

An information providing apparatus, for a vehicle, includes a skill level determining unit, a driving load determining unit, and an information provision controller. The skill level determining unit is configured to determine a driving skill level of a driver of the vehicle when the vehicle is traveling. The driving load determining unit is configured to determine a driving load on the driver. The information provision controller is configured to control provision of information to the driver on the basis of the driving skill level and the driving load.

9 Claims, 7 Drawing Sheets

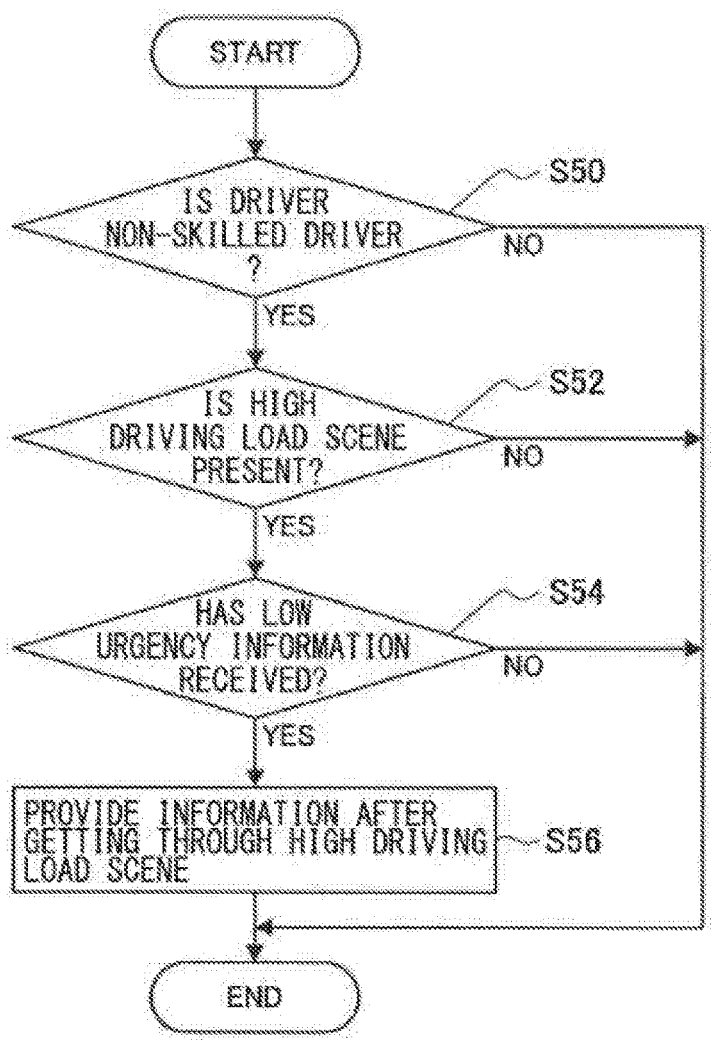

FIG. 5

| SCENE | REMARKS |
|---|---|
| AROUND INTERSECTION | A region from a point before an intersection by a distance L1 to a point of the intersection is determined as a region around the intersection. (excluding a case where the vehicle is stopped.) |
| AROUND HIGHWAY JUNCTION | A region from a point before a highway junction by a distance L2 to a point of the highway junction is determined as a region around the highway junction. |
| CURVED ROAD | A road having a radius of curvature equal to or greater than a predetermined value Rc is determined as a curved road. |
| NARROW ROAD | A road having a road width equal to or smaller than a predetermined value Wc is determined as a narrow road. |

FIG. 6

INFORMATION PROVIDING APPARATUS AND METHODS FOR A VEHICLE

CROSS-REFERENCE TO RELATED APPLICATIONS

The present application claims priority from Japanese Patent Application No. 2019-041863 filed on Mar. 7, 2019, the entire contents of which are hereby incorporated by reference.

BACKGROUND

The technology relates to an information providing apparatus for vehicle, an information providing method for vehicle, and a computer-readable recording medium.

There has been a technique that assists a driver in accordance with a skill level of the driver. For example, Japanese Unexamined Patent Application Publication No. 2003-099897 discloses a technique that determines a skill level of a driver, determines assistance contents in accordance with the skill level of the driver, and performs, by a warning device, assistance based on the determined assistance contents.

SUMMARY

An aspect of the technology provides an information providing apparatus, for a vehicle. The apparatus includes a skill level determining unit, a driving load determining unit, and an information provision controller. The skill level determining unit is configured to determine a driving skill level of a driver of the vehicle when the vehicle is traveling. The driving load determining unit is configured to determine a driving load on the driver. The information provision controller is configured to control provision of information to the driver on the basis of the driving skill level and the driving load.

An aspect of the technology provides an information providing method for a vehicle, the method including: determining a driving skill level of a driver of the vehicle when the vehicle is traveling; determining a driving load on the driver; and controlling provision of information to the driver on the basis of the driving skill level and the driving load.

An aspect of the technology provides a non-transitory computer-readable recording medium containing a program. The program causes, when executed by a computer, the computer to implement a method. The method includes: determining a driving skill level of a driver of a vehicle when the vehicle is traveling; determining a driving load on the driver; and controlling provision of information to the driver on the basis of the driving skill level and the driving load.

An aspect of the technology provides an information providing apparatus, for a vehicle. The apparatus includes circuitry. The circuitry is configured to determine a driving skill level of a driver of the vehicle when the vehicle is traveling, determine a driving load on the driver, and control provision of information to the driver on a basis of the driving skill level and the driving load.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is a flowchart illustrating an example of suppressing an amount of provided information in a scene where a driving load on the driver is high.

FIG. 6 is an explanatory diagram listing examples of the scene where the driving load on the driver is high.

DETAILED DESCRIPTION

Figure 1:
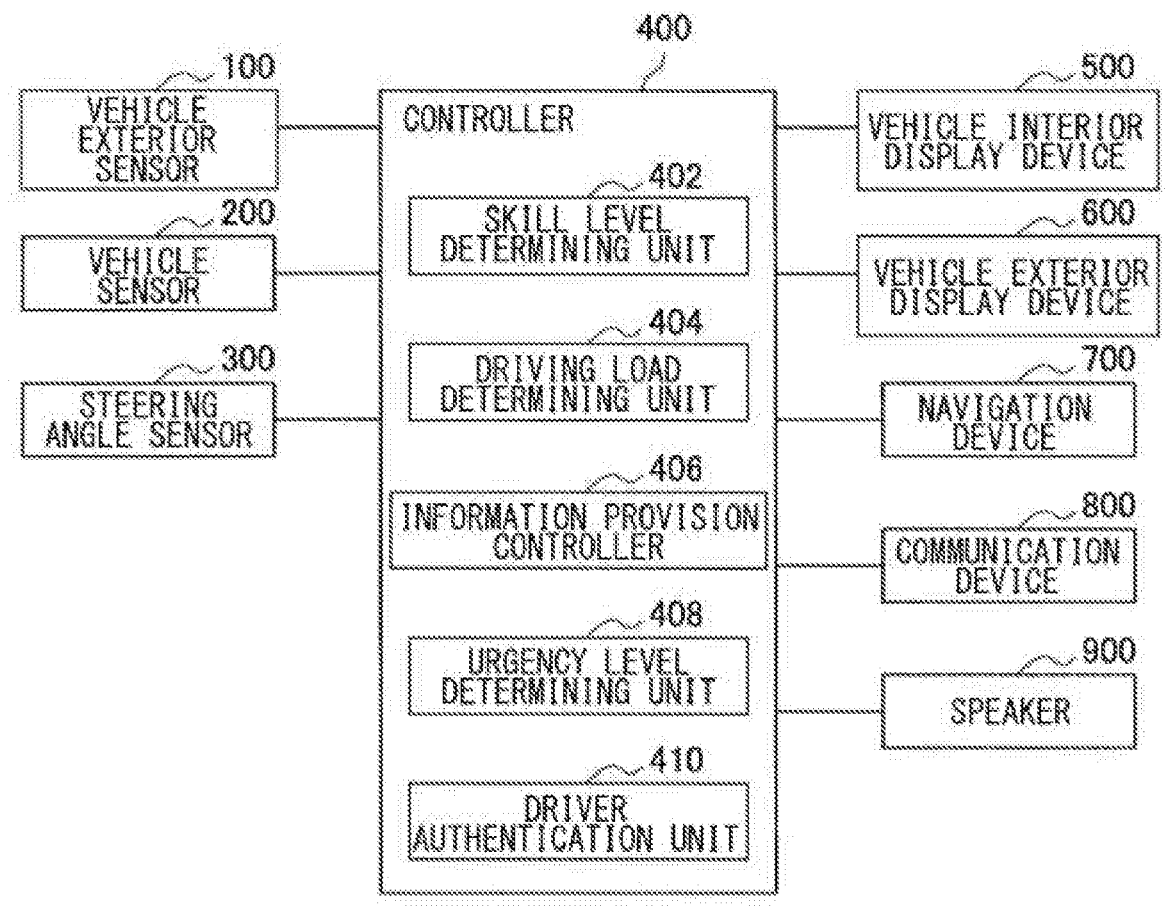
FIG. 1 is a schematic view of an example of a configuration of a vehicle system according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

FIG. 1 is a schematic view of a configuration of a vehicle system 1000 according to an example embodiment of the technology. The vehicle system 1000 may be basically mounted on a vehicle such as an automobile. The vehicle system 1000 may include a vehicle exterior sensor 100, a vehicle sensor 200, a steering angle sensor 300, a controller 400, a vehicle interior display device 500, a vehicle exterior display device 600, a navigation device 700, a communication device 800, and a speaker 900, as illustrated in FIG. 1.

The vehicle exterior sensor 100 may include a device such as a stereo camera, a monocular camera, a millimeter-wave radar device, or an infrared sensor. The vehicle exterior sensor 100 may measure a position and a speed of an object around the own vehicle such as a person or another vehicle. In a case where the vehicle exterior sensor 100 includes the stereo camera, the stereo camera may include a pair of a right camera and a left camera. The right camera and the left camera may each include an imaging device such as a charge-coupled device (CCD) sensor or a complementary metal oxide semiconductor (CMOS) sensor. The stereo camera may pick up an image of an external environment outside the vehicle and supply information of the picked-up image to the controller 400. In one non-limiting example, the stereo camera may include color cameras that are able to acquire color information, and may be disposed at an upper portion of a windshield of the vehicle.

The vehicle sensor 200 may acquire information communicated by means of an in-vehicle controller area network (CAN) such as information regarding a speed, acceleration, an angular velocity, or a yaw rate of the vehicle. The above-described information may be acquired from various sensors. The steering angle sensor 300 may be attached to a steering wheel and detect a steering angle of the steering wheel.

The controller 400 controls provision of information to a driver who drives the vehicle, on the basis of a driving skill level of the driver. In a specific but non-limiting example, the controller 400 may suppress, on the basis of a driving load on the driver, provision of information to the driver in a high driving load scene, i.e., a scene in which the driving load on the driver is high. The controller 400 may also suppress provision, to the driver, of low urgency information, i.e., information of a low urgency level. The controller 400 may include a skill level determining unit 402, a driving load determining unit 404, an information provision controller 406, an urgency level determining unit 408, and a driver authentication unit 410 in the example embodiment. The skill level determining unit 402 may determine a driving skill level of the driver. The driving load determining unit 404 may determine the driving load, i.e., a load related to driving on the driver. The information provision controller 406 may control the provision of information to the driver on the basis of the driving skill level and the driving load, and control provision of information by means of the vehicle interior display device 500, the speaker 900, or both. The urgency level determining unit 408 may determine an urgency level of the information to be provided to the driver. The driver authentication unit 410 may perform authentication of the driver who actually drives the vehicle. The authentication of the driver may be performed, for example, by authentication of a face or a fingerprint of the driver. A method of performing the authentication is, however, not limited thereto and may be any of various methods. Although FIG. 1 illustrates the configuration of the controller 400 as a functional module, the controller 400 may physically include a central processing unit (CPU), various storage devices, and a hardware configuration, i.e., circuitry, and be mounted with a program or software that causes the CPU, the various storage devices, and the hardware configuration to operate. Non-limiting examples of the various storage devices may include a read-only memory (ROM) and a random-access memory (RAM). Non-limiting example of the hardware configuration may include an input-output interface.

The vehicle interior display device 500 may include a display unit disposed inside a compartment of the vehicle. For example, the vehicle interior display device 500 may perform display at a location such as an interior dash panel or a region around a meter. The vehicle exterior display device 600 may include a display unit disposed outside the compartment of the vehicle. Non-limiting examples of the vehicle exterior display device 600 may include a head-up display (HUD) device or a side-view mirror. The HUD device may display, at a location such as a front windshield or a rear windshield of the vehicle, a virtual image of the display unit disposed outside the compartment of the vehicle, to be more accurate, a virtual image of a display unit that looks as if the display unit is disposed outside the compartment of the vehicle.

The communication device 800 may communicate with outside of the vehicle, and thereby receive various pieces of information such as traffic congestion information or road information. The navigation device 700 may search for a route from a current position to a destination on the basis of map information. The map information may be acquired by communication with the outside of the vehicle, or may be stored in the navigation device 700 in advance. The navigation device 700 may be able to acquire the current position of the vehicle by a method such as a global positioning system (GPS) and display the acquired current position on a road map. The navigation device 700 may hold information regarding a route to the current position that has been traveled by the vehicle for a predetermined distance. The distance of the route to be stored in the navigation device 700 may be appropriately set by a manufacturer of the vehicle or a dealer of the vehicle in accordance to a factor such as a storage capacity of the navigation device 700, for example.

The speaker 900 may be so coupled to the controller 400 as to be associated with the controller 400. The speaker 900 may provide information to the driver by audio on the basis of a command signal provided by the controller 400. Non-limiting examples of the audio may include a warning sound.

Figure 2:
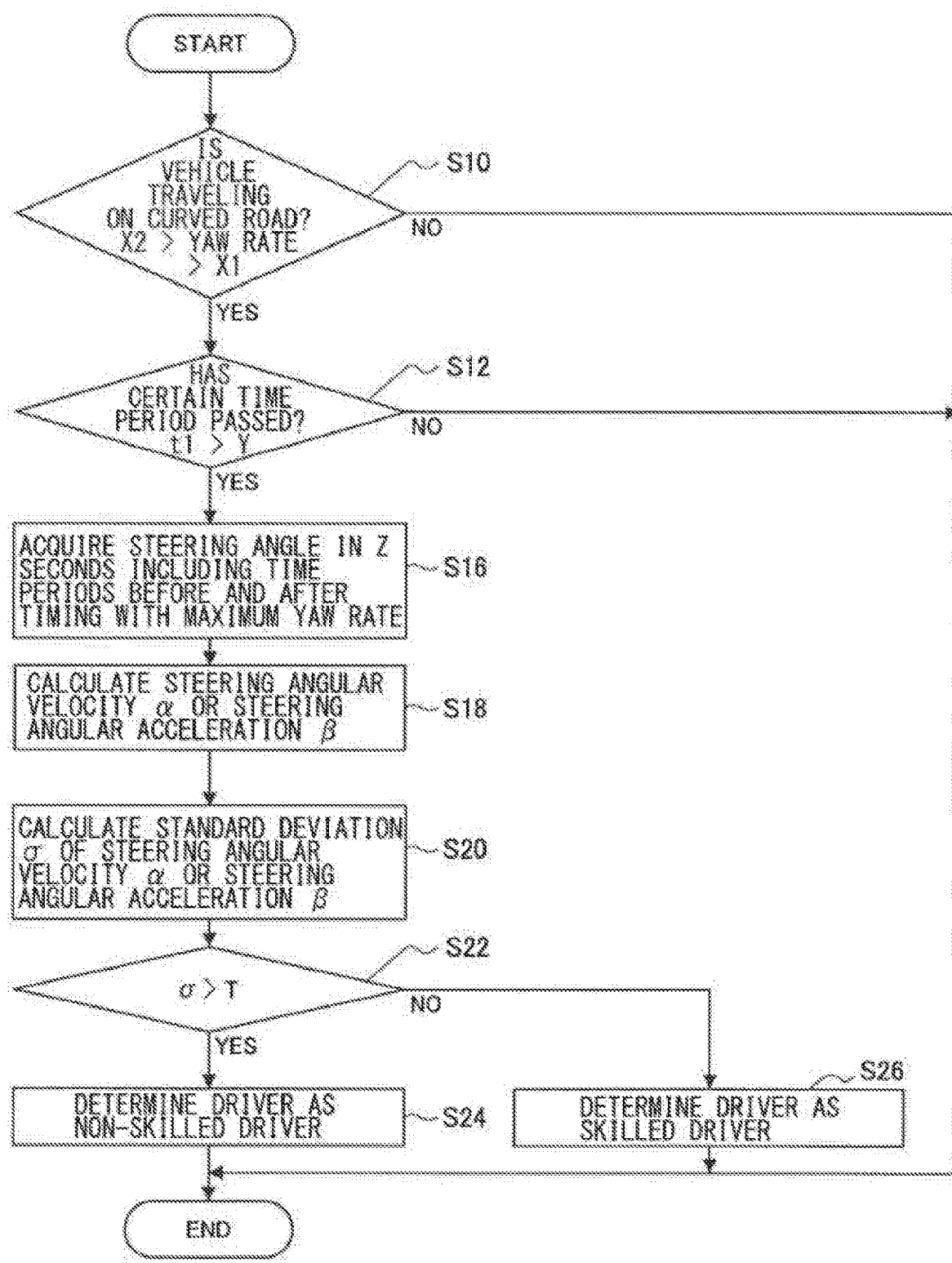
FIG. 2 is a flowchart illustrating an example of a process of determining whether a driver is a skilled driver when a vehicle is traveling on a curved road, as an example of a process of determining a driving skill level of the driver.
Figure 3:
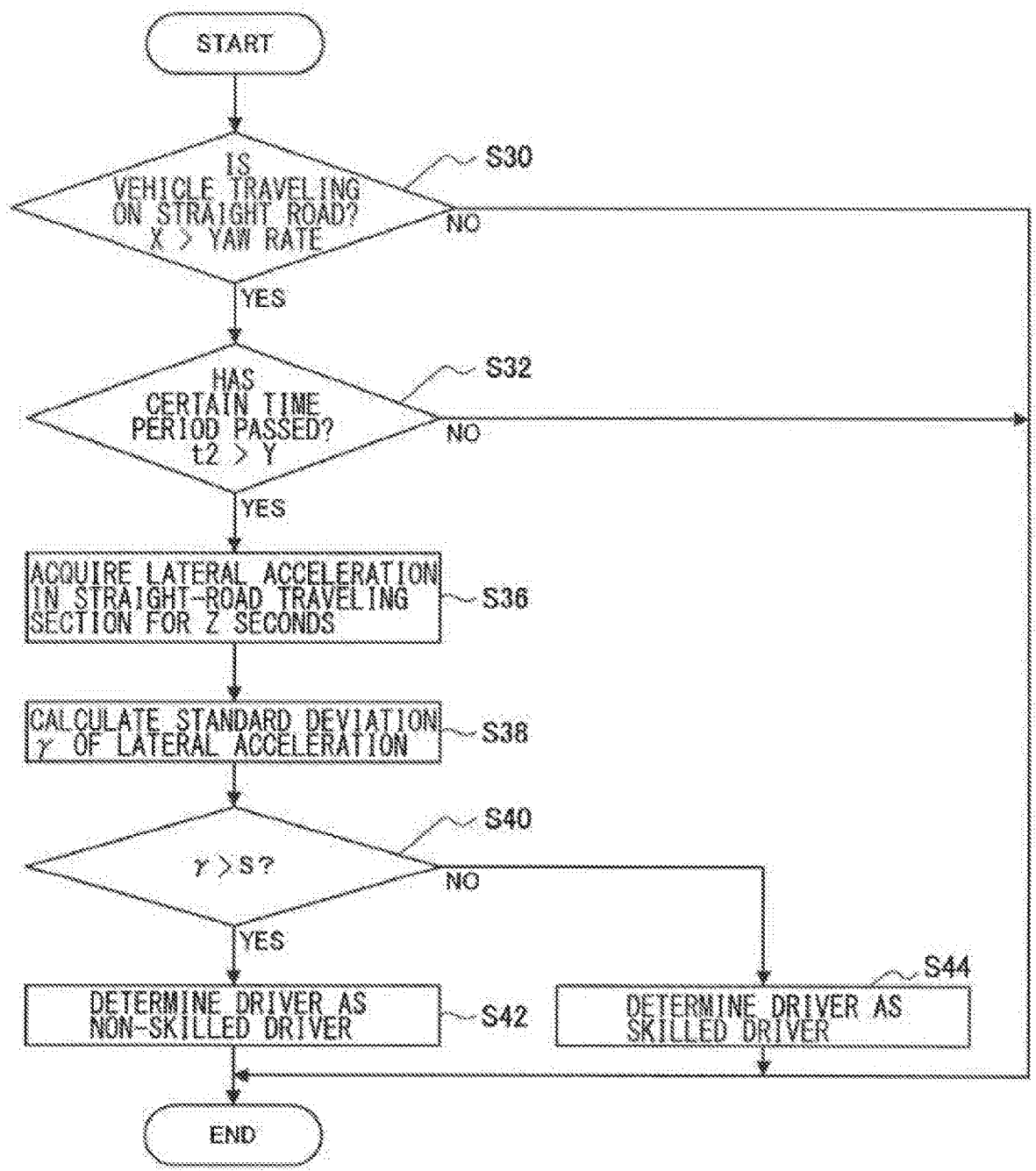
FIG. 3 is a flowchart illustrating an example of a process of determining whether the driver is the skilled driver when the vehicle is traveling on a straight road, as an example of the process of determining the driving skill level of the driver.

FIGS. 2 and 3 are each a flowchart illustrating an example of a process of determining whether the driver is a skilled driver. The process illustrated in each of FIGS. 2 and 3 may be performed every predetermined cycle by the controller 400, mainly, by the skill level determining unit 402. FIG. 2 illustrates a process of determining the driving skill level on the basis of a driving state when the vehicle is traveling on a curved road. The curved road may be a road with a single curved portion or a road with a plurality of curved portions. The road with the single curved portion is a road with no need to perform switching of steering. The road with the plurality of curved portions is a road on which switching of steering is needed.

First, in step S10, the controller 400 may determine whether the vehicle is traveling on the curved road on the basis of the yaw rate of the vehicle detected by the vehicle sensor 200. In a specific but non-limiting example, the controller 400 may determine that the vehicle is traveling on the curved road when the yaw rate is greater than a first threshold X1 and smaller than a second threshold X2 in step S10. When the vehicle is determined as being traveling on the curved road (YES in step S10), the process may proceed to step S12. When the vehicle is determined as not being traveling on the curved road (NO in step S10), the controller 400 may bring the process to an end.

In step S12, the controller 400 may determine whether a curved-road traveling time period t1, i.e., a time period during which the vehicle is traveling on the curved road, reaches a certain time period. In a specific but non-limiting example, the controller 400 may measure the curved-road traveling time period t1, and determine whether the measured curved-road traveling time period t1 is greater than a threshold Y. When the curved-road traveling time period t1 is greater than the threshold Y (YES in step S12), the controller 400 may determine that the curved-road traveling time period t1 reaches the certain time period, and the process may proceed to step S16. When the curved-road traveling time period t1 is equal to or smaller than the threshold Y (NO in step S12), the controller 400 may determine that the curved-road traveling time period t1 does not reach the certain time period and bring the process to an end.

In step S16, the controller 400 may acquire a steering angle in a time period of Z seconds that include time periods before and after timing at which the yaw rate of the vehicle has a maximum value, i.e., a peak value, in the curved-road traveling time period t1 on the basis of the yaw rate of the vehicle detected by the vehicle sensor 200. The time period of Z seconds that includes the time periods before and after the timing at which the yaw rate of the vehicle has the maximum value may be, in other words, the time period of Z seconds that includes the timing at which the yaw rate of the vehicle has the maximum value therein. In step S18 thereafter, the controller 400 may calculate one of a steering angular velocity $\alpha$ and a steering angular acceleration $\beta$ in the time period of Z seconds. In step S20 thereafter, the controller 400 may calculate a standard deviation $\sigma$ of the calculated one of the steering angular velocity $\alpha$ and the steering angular acceleration $\beta$.

In step S22 thereafter, the controller 400 may determine whether a value of the standard deviation $\sigma$ is greater than a predetermined threshold T. When the value of the standard deviation $\sigma$ is determined as being greater than the predetermined threshold T (YES in step S22), the process may proceed to step S24. In a case where the process proceeds to step S24, it may be considered that steering is unstable since variation in the calculated one of the steering angular velocity $\alpha$ and the steering angular acceleration $\beta$ is relatively great. Accordingly, the controller 400 may determine that the driver is a non-skilled driver in step S24. The controller 400 may bring the process to an end after performing the process in step S24.

In contrast, when the value of the standard deviation $\sigma$ is determined as being equal to or smaller than the predetermined threshold T (NO in step S22), the process may proceed to step S26. In a case where the process proceeds to step S26, it may be considered that the steering is stable since the variation in the calculated one of the steering angular velocity $\alpha$ and the steering angular acceleration $\beta$ is relatively small. Accordingly, the controller 400 may determine that the driver is the skilled driver in step S26. The controller 400 may bring the process to an end after performing the process in step S26.

Figure 4A:
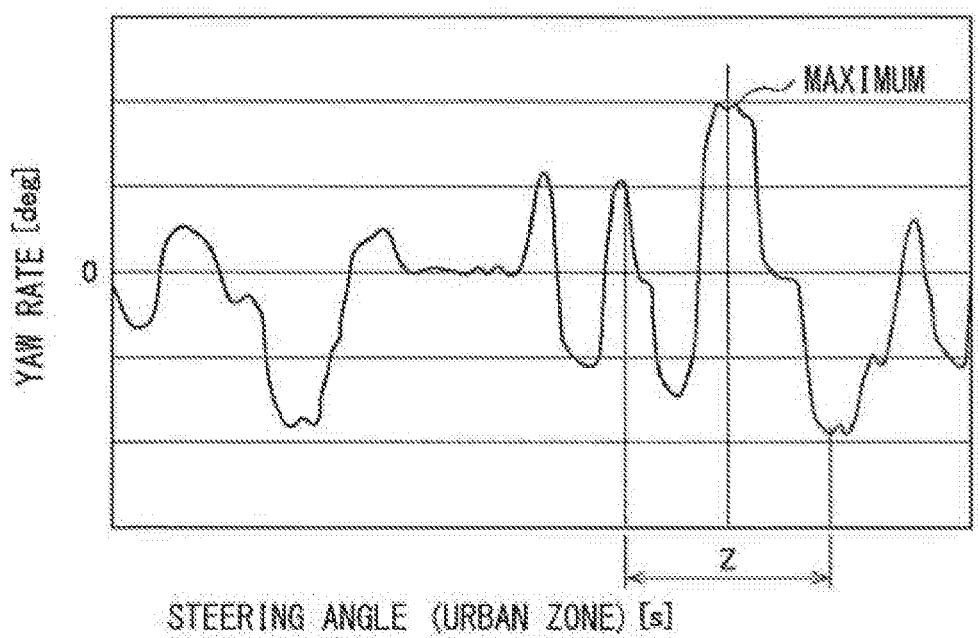
FIG. 4A is a characteristic diagram illustrating a steering angle in a time period of Z seconds including time periods before and after timing at which a yaw rate has a maximum value, i.e., a peak value, in step S16 in FIG. 2.
Figure 4B:
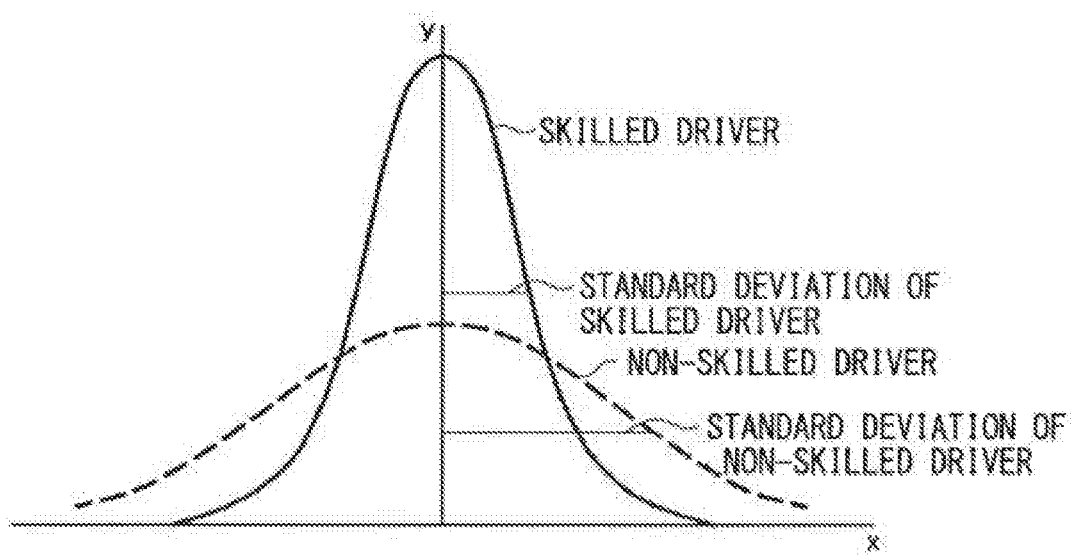
FIG. 4B illustrates a characteristic diagram illustrating an example of standard deviations of the skilled driver and a non-skilled driver determined on the basis of a distribution of steering angular velocity in the time period of Z seconds.

FIG. 4A is a characteristic diagram illustrating the steering angle in the time period of Z seconds including the time periods before and after the timing at which the yaw rate has the maximum value, i.e., the peak value, in step S16. FIG. 4B is a characteristic diagram illustrating standard deviations of the skilled driver and the non-skilled driver determined on the basis of a distribution of the steering angular velocity in the time period of Z seconds. As illustrated in FIG. 4B, the distribution of the steering angular velocity of the skilled driver may be narrower than that of the non-skilled driver, and a value of the standard deviation of the skilled driver may be therefore greater than that of the non-skilled driver.

FIG. 3 illustrates a process of determining the driving skill level of the driver on the basis of a driving state at a time when the vehicle is traveling on a straight road. Wobbling of the vehicle that is traveling on the straight road may be evaluated on the basis of a standard deviation of a lateral acceleration of the vehicle to thereby determine the driving skill level in this process.

First, in step S30, the controller 400 may determine whether the vehicle is traveling on the straight road on the basis of the yaw rate of the vehicle detected by the vehicle sensor 200. In a specific but non-limiting example, the controller 400 may determine that the vehicle is traveling on the straight road in a case where the yaw rate is smaller than a predetermined threshold X in step S30. When the vehicle is determined as being traveling on the straight road (YES in step S30), the process may proceed to step S32. When the vehicle is determined as not being traveling on the straight road (NO in step S30), the controller 400 may bring the process to an end.

In step S32, the controller 400 may determine whether a straight-road traveling time period t2, i.e., a time period during which the vehicle is traveling on the straight road, reaches a certain time period. In a specific but non-limiting example, the controller 400 may measure the straight-road traveling time period t2, and determine whether the measured straight-road traveling time period t2 is greater than a threshold Y. When the straight-road traveling time period t2 is greater than the threshold Y (YES in step S32), the controller 400 may determine that the straight-road traveling time period t2 reaches the certain time, and the process may proceed to step S36. When the straight-road traveling time period t2 is equal to or smaller than the threshold Y (NO in step S32), the controller 400 may determine that the straight-road traveling time period t2 does not reach the certain time period and bring the process to an end.

In step S36, the controller 400 may acquire a lateral acceleration in a straight-road traveling section in which the yaw rate is relatively small in the straight-road traveling time period t2, on the basis of the lateral acceleration of the vehicle acquired by the vehicle sensor 200. In step S38 thereafter, the controller 400 may calculate a standard deviation $\gamma$ of the lateral acceleration acquired in step S36.

In step S40 thereafter, the controller 400 may determine whether a value of the standard deviation $\gamma$ is greater than a predetermined threshold S. When the value of the standard deviation $\gamma$ is determined as being greater than the predetermined threshold S (YES in step S40), the process may proceed to step S42. In a case where the process proceeds to step S42, it may be considered that behavior of the vehicle is unstable since variation in the lateral acceleration is relatively great. Accordingly, the controller 400 may determine that the driver is the non-skilled driver in step S42. The controller 400 may bring the process to an end after performing the process in step S42.

In contrast, when the value of the standard deviation $\gamma$ is determined as being equal to or smaller than the predetermined threshold S (NO in step S40), the process may proceed to step S44. In a case where the process proceeds to step S44, it may be considered that the behavior of the vehicle is stable since the variation in the lateral acceleration is relatively small. Accordingly, the controller 400 may determine that the driver is the skilled driver in step S44. The controller 400 may bring the process to an end after performing the process in step S44.

The controller 400, or the skill level determining unit 402, may be able to determine, on the basis of a result of the authentication performed by the driver authentication unit 410, the driving skill level of a driver whose driving skill level has been already determined. For example, in a case where a driver A that has been determined as the non-skilled driver in the past drives the vehicle again, the authentication of the driver A by the driver authentication unit 410 may allow for determination of the driver A as the non-skilled driver without performing the process illustrated in FIG. 2 or 3. Similarly, for example, in a case where a driver B that has been determined as the skilled driver in the past drives the vehicle again, the authentication of the driver B by the driver authentication unit 410 may allow for determination of the driver B as the skilled driver without performing the process illustrated in FIG. 2 or 3.

The determination of the driving skill level may be performed by a method other than the methods illustrated in FIGS. 2 and 3. In one example, the determination of the driving skill level of the driver may be performed by evaluating smoothness of the acceleration on the basis of a standard deviation of a variation rate of an accelerator pedal position. In another example, the determination of the driving skill level of the driver may be performed by evaluating the wobbling of the vehicle traveling on the straight road on the basis of a traveling locus obtained by means of the GPS of the navigation device 700, lane line detection by the vehicle exterior sensor 100, or any other method. The evaluation of the driving skill level may be evaluated, for example but not limited to, on the basis of comparison with a threshold of any of a result of analysis of a frequency of the steering angular velocity, a time at which an absolute value of the steering angular velocity exceeds a predetermined value, how many times the absolute value of the steering angular velocity exceeds the predetermined value, how often the absolute value of the steering angular velocity exceeds the predetermined value, a standard deviation of the yaw rate, and the number of times the vehicle deviated from a lane with a threshold, other than the traveling locus. The evaluation of the driving skill level may also be determined by evaluating a way of keeping a clearance between the own vehicle and another vehicle on the basis of a standard deviation of a time left before the own vehicle come into contact with the other vehicle.

According to the example embodiment, the provision of information to the driver may be controlled in accordance with the driving skill level of the driver on the basis of a result of the determination of the driving skill level obtained as described above. In a specific but non-limiting example of the example embodiment, the provision of information to the driver in the high driving load scene may be suppressed in a case where the driver is the non-skilled driver, compared with the case where the driver is the skilled driver. This allows the driver to concentrate on driving without being distracted to recognize and understand the provided information. FIG. 5 is a flowchart illustrating an example of a process of suppressing an amount of the provided information in the high driving load scene as an example of a process related to the provision of information applicable to the example embodiment. It is to be noted that suppressing of the amount of the provided information may include not only to reduce the number of pieces of information to be displayed or provided but also to suppress the number of types of the information. The suppressing of the amount of the provided information may also include limiting provision of information by phone, provision of information by the navigation device 700, provision of information such as a warning of a low-urgency matter, or any other provision of information.

First, in step S50, the controller 400 may determine whether the driver is the non-skilled driver. When the driver is determined as being the non-skilled driver (YES in step S50), the process may proceed to step S52. When the driver is determined as being the skilled driver (NO in step S50), a control of a current routine may be brought to an end.

In step S52, the controller 400 may determine whether the high driving load scene is present. In the example embodiment, the determination in step S52 may be performed by the driving load determining unit 404, for example, on the basis of information such as navigation information obtained from the navigation device 700 or the road information which the communication device 800 acquires from outside. FIG. 6 is an explanatory diagram describing some examples of the high driving load scene. In a case where the vehicle is currently at a location such as a location around an intersection, a location around a highway junction, a curved-road section, or a narrow road, the high driving load scene may be determined as being present, as described in FIG. 6. In a specific but non-limiting example, in a case where the vehicle is at the location around the intersection defined as a region from a point before the intersection by a distance L1 to a point of the intersection, the high driving load scene may be determined as being present. In another specific but non-limiting example, in a case where the vehicle is at the location around the highway junction defined as a region from a point before the highway junction by a distance L2 to a point of the highway junction, the high driving load scene may be determined as being present. In still another specific but non-limiting example, in a case where the vehicle is traveling on a curved road defined as a road having a radius of curvature equal to or greater than a predetermined value Rc, the high driving load scene may be determined as being present. In still another specific but non-limiting example, in a case where the vehicle is traveling on the narrow road defined as a road having a road width equal to or smaller than a predetermined value Wc, the high driving load scene may be determined as being present.

When the high driving load scene is determined as being present in step S52 (YES in step S52), the process may proceed to step S54. When the high driving load scene is determined as not being present in step S52 (NO in step S52), the control of the current routine may be brought to an end.

In step S54, the controller 400 may determine whether the communication device 800 has received the low urgency information. In other words, the controller 400 may determine whether the information received by the communication device 800 has a high urgency level or a low urgency level. The determination in step S54 may be performed by the urgency level determining unit 408 in the present example embodiment. Non-limiting examples of the low urgency information may include traffic information, navigation information, and a warning of a low-urgency matter. When the low urgency information is determined as having been received in step S54 (YES in step S54), the process may proceed to step S56. When high urgency information, i.e., information having a high urgency level, is determined as having been received in step S54 (NO in step S54), the process in step S56 thereafter may be skipped and the control may be brought to an end.

In step S56, the controller 400 may perform the provision of information after the vehicle gets through the high driving load scene. In other words, in the case where the low urgency information has been received, the controller 400 may suspend provision of the received low urgency information while the high driving load scene is present after the reception of the low urgency information, wait for the driver to get through the high driving load scene, and provide the low urgency information after the driver gets through the high driving load scene. The provision of information to the driver may be performed in a visual way by means of display on the vehicle interior display device 500 or the vehicle exterior display device 600, or may be performed in an auditory way by means of an audio outputted by the speaker 900.

Figure 7:
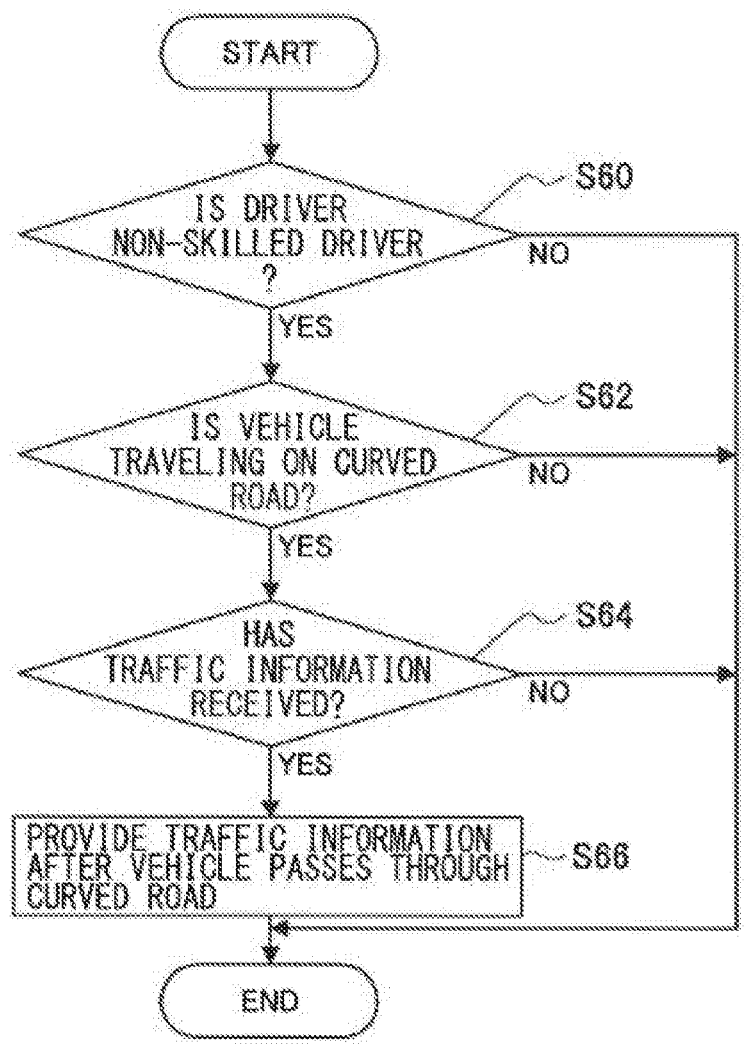
FIG. 7 is a flowchart illustrating an example of a process of providing the information after the vehicle passes through the curved road, in order to suppress the amount of the provided information when the vehicle is traveling on the curved road.

FIG. 7 is a flowchart illustrating an example of a process of providing information after the vehicle passes through the curved road, in order to suppress the amount of the provided information while the vehicle is traveling on the curved road.

First, in step S60, the controller 400 may determine whether the driver is the non-skilled driver. When the driver is determined as being the non-skilled driver (YES in step S60), the process may proceed to step S62. When the driver is determined as being the skilled driver (NO in step S60), a control of a current routine may be brought to an end.

In step S62, the controller 400 may determine whether the vehicle is traveling on the curved road. The determination as to whether the vehicle is traveling on the curved road may be performed in a manner similar to that in step S10 in FIG. 2.

When the vehicle is determined as being traveling on the curved road in step S62 (YES in step S62), the flow may proceed to step S64. When the vehicle is determined as not being traveling on the curved road (NO in step S62), the control of the current routine may be brought to an end.

In step S64, the controller 400 may determine whether the communication device 800 has received the traffic information while the vehicle is traveling on the curved road. When the traffic information is determined as having been received (YES in step S64), the process may proceed to step S66. When the traffic information is determined as not having been received (NO in step S64), a process in step S66 thereafter may be skipped and the control may be brought to an end. A case where the traffic information is determined as not having been received may include a case where the communication device 800 has received information other than the traffic information and a case where the communication device 800 has received no information.

In step S66, the controller 400, or in more detail, the information provision controller 406, may control the provision of information to the driver, and thereby provide the received traffic information after the vehicle passes through the curved road. The provision of information to the driver may be performed in a visual way by means of display on the vehicle interior display device 500 or the vehicle exterior display device 600, or may be performed in an auditory way by means of an audio outputted by the speaker 900. In a case where information such as information obtained by calling on a phone, the navigation information, or the warning of a low-urgency matter other than the traffic information is received, provision of the received information to the driver may be suppressed while the vehicle is traveling on the curved road, in one example.

Figure 8:
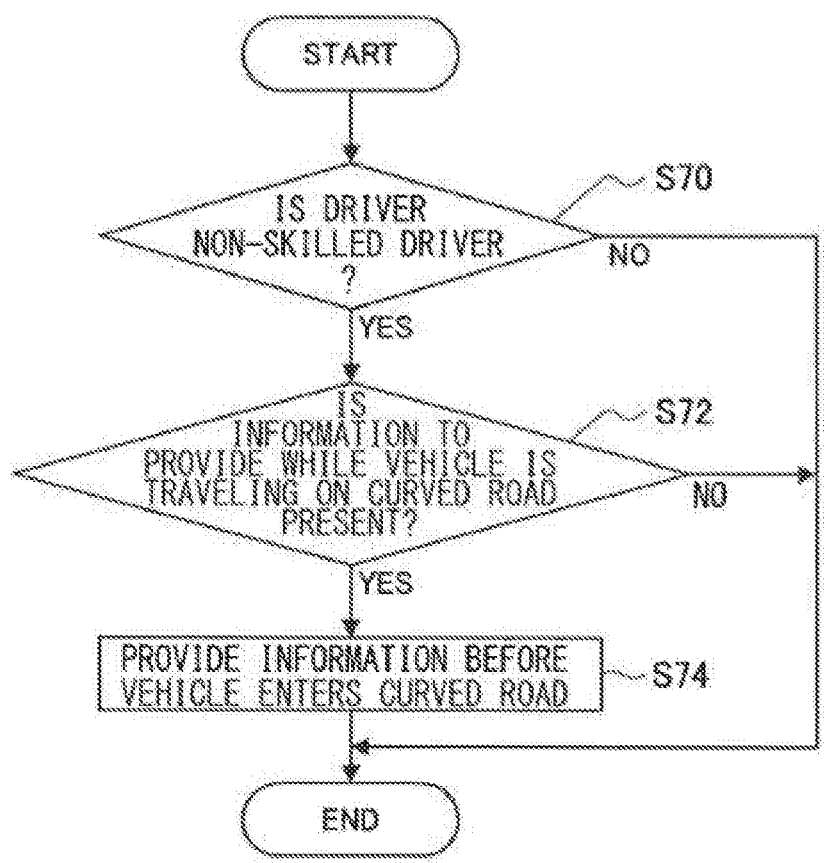
FIG. 8 is a flowchart illustrating an example of a process of providing the information before the vehicle enters the curved road, in order to suppress the amount of the provided information when the vehicle is traveling on the curved road.

FIG. 8 is a flowchart illustrating an example of a process of providing information before the vehicle enters the curved road, in order to suppress the amount of the provided information while the vehicle is traveling on the curved road. Non-limiting example of a case to which the process illustrated in FIG. 8 is applicable may include a case where a route along which the vehicle is to turn left or right immediately after passing through the curved road is set by the navigation device 700. The provision of information may be usually performed at a position that is within the curved section and before a turn-left point or a turn-right point by a certain distance. Non-limiting examples of the turn-left point and the turn-right point may include an intersection. In the example embodiment, the provision of information to the driver may be performed before the vehicle enters the curved road and the driver may be notified in advance of turning left or right. This allows for suppression of the amount of the provided information while the vehicle is traveling on the curved road, which makes it possible for the driver to turn left or right in a prepared state.

First, in step S70, the controller 400 may determine whether the driver is the non-skilled driver. When the driver is determined as being the non-skilled driver (YES in step S70), the flow may proceed to step S72. When the driver is determined as being the skilled driver (NO in step S70), a control of a current routine may be brought to an end. In step S72, the controller 400 may determine whether information to be provided to the driver while the vehicle is traveling on the curved road is present. When the information to be provided to the driver while the vehicle is traveling on the curved road is determined as being present (YES in step S72), the process may proceed to step S74. A case where the information to be provided to the driver while the vehicle is traveling on the curved road is present may include a case where an intersection is present ahead in a traveling direction at which the vehicle is to turn left or right. When the information to be provided to the driver while the vehicle is traveling on the curved road is determined as being absent (NO in step S72), the process in step S74 thereafter may be skipped and the control may be brought to an end. In step S74, the controller 400, in more detail, the information provision controller 406, may control the provision of information to the driver and perform the provision of information to the driver before the vehicle enters the curved road, in order to suppress the provision of information while the vehicle is traveling on the curved road.

Provision of information from a vehicle to a driver of the vehicle may be performed generally. Such provision of information is allowed to be performed in a visual way by means of a navigation device or a HUD device, or may be performed in an auditory way by means of a speaker, for example. In a case where the information is provided excessively to the driver, the driver may be distracted to recognize and understand the information, which may disturb the driver's driving, although this may be different between individuals. The case where the information is provided excessively may include not only a case where a great amount of the information is provided but also a case where the great number of types of information are provided. In a case where a driving skill level of the driver is not sufficiently high, the excessive provision of information may adversely influence concentration of the driver, which can adversely prevent smooth driving. Accordingly, it may be desired to take into consideration the driving skill level of the driver when performing the provision of information.

According to the example embodiment, the driving skill level of the driver is determined, the driving load on the driver is determined, and the provision of information to the driver is controlled on the basis of the driving skill level and the driving load. It is therefore possible to suppress an adverse influence, on driving, of the provision of information. For example, the provision of information to the non-skilled driver may be suppressed or suspended in the high driving load scene, and appropriate provision of information may be performed after the vehicle passes through the high driving load scene or before the vehicle enters the high driving load scene. This makes it possible to allow the non-skilled driver to concentrate on driving in the high driving load scene, which contributes to achievement of stable traveling.

Although some example embodiments of the technology have been described above in detail with reference to the accompanying drawings, the example embodiments described above do not limit the technology. It is clear that a person with a usual knowledge in a technical field of the technology is able to arrive at various alternations and modifications in the scope of the technical idea described in the appended claims. It should be clearly appreciated that such alternations and modifications are encompassed in the technical scope of the technology.

According to one embodiment of the technology, it is possible to control provision of information to a driver in accordance with a driving skill level of the driver.

Each of the controller 400, the skill level determining unit 402, the driving load determining unit 404, the information provision controller 406, the urgency level determining unit 408, and the driver authentication unit 410 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the controller 400, the skill level determining unit 402, the driving load determining unit 404, the information provision controller 406, the urgency level determining unit 408, and the driver authentication unit 410 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the controller 400, the skill level determining unit 402, the driving load determining unit 404, the information provision controller 406, the urgency level determining unit 408, and the driver authentication unit 410 illustrated in FIG. 1.

The invention claimed is:

1. An information providing apparatus for a vehicle, the information providing apparatus comprising:
a skill level determining unit configured to determine a driving skill level of a driver of the vehicle when the vehicle is traveling;
a driving load determining unit configured to determine a driving load on the driver;
an information provision controller configured to control provision of information to the driver on a basis of the driving skill level and the driving load,
wherein the information provision controller is configured to suppress the provision of information to the driver in response to determining that the driving skill level is low and the driving load is a high driving load scene; and
an urgency level determining unit configured to determine an urgency level of the information to be provided to the driver, wherein
the information provision controller is configured to stop the provision of low urgency information during a period when the driving load is high in response to determining that the driving skill level is low, the low urgency information is information determined by the urgency level determining unit that the urgency level is low.

2. The information providing apparatus according to claim 1, wherein the skill level determining unit is configured to determine the driving skill level on a basis of a steering angle of the vehicle at a time when the vehicle is traveling on a curved road.

3. The information providing apparatus according to claim 1, wherein the skill level determining unit is configured to determine the driving skill level on a basis of a lateral acceleration of the vehicle at a time when the vehicle is traveling on a straight road.

4. The information providing apparatus according to claim 1, wherein the driving load determining unit determines the driving load based on a road map information and a current position obtained from a navigation device, and
the urgency level determining unit determines a route guidance information obtained from the navigation device as the low urgency information.

5. The information providing apparatus according to claim 4, wherein the driving load determining unit determines that the driving load is high when the vehicle is traveling on a curved road.

6. The information providing apparatus according to claim 5, wherein the information provision controller determines whether a provision of the route guidance information is scheduled when the vehicle is traveling on the curved road by the navigation device; and perform the provision of the route guidance information before the vehicle reaches the curved road in a case that the provision of the route guidance information is scheduled during the curved road.

7. An information providing method for a vehicle, the method comprising:
determining a driving skill level of a driver of the vehicle when the vehicle is traveling;
determining a driving load on the driver; and
controlling provision of information to the driver on a basis of the driving skill level and the driving load,
wherein controlling provision of information to the driver comprises suppressing the provision of information to the driver in response to determining that the driving skill level is low and the driving load is a high driving load scene; and
determining an urgency level of the information to be provided to the driver, wherein the provision of low urgency information is stopped during a period when the driving load is high in response to determining that the driving skill level is low, the low urgency information is information determined that the urgency level is low.

8. A non-transitory computer-readable recording medium containing a program, the program causing, when executed by a computer, the computer to implement a method, the method comprising:
determining a driving skill level of a driver of a vehicle when the vehicle is traveling;
determining a driving load on the driver; and
controlling provision of information to the driver on a basis of the driving skill level and the driving load, wherein controlling provision of information to the driver comprises suppressing the provision of information to the driver in response to determining that the driving skill level is low and the driving load is a high driving load scene; and determining an urgency level of the information to be provided to the driver, wherein the provision of low urgency information is stopped during a period when the driving load is high in response to determining that the driving skill level is low, the low urgency information is information determined that the urgency level is low.

9. An information providing apparatus for a vehicle, the information providing apparatus comprising circuitry configured to determine a driving skill level of a driver of the vehicle when the vehicle is traveling, determine a driving load on the driver, and control provision of information to the driver on a basis of the driving skill level and the driving load, wherein controlling provision of information to the driver comprises suppressing the provision of information to the driver in response to determining that the driving skill level is low and the driving load is a high driving load scene; and determining an urgency level of the information to be provided to the driver, wherein the provision of low urgency information is stopped during a period when the driving load is high in response to determining that the driving skill level is low, the low urgency information is information determined that the urgency level is low.

* * * * *